(12) United States Patent
Yasuoka et al.

(10) Patent No.: US 7,198,868 B2
(45) Date of Patent: Apr. 3, 2007

(54) ALKALINE STORAGE BATTERY

(75) Inventors: Shigekazu Yasuoka, Kobe (JP); Tetsuyuki Murata, Kobe (JP); Jun Ishida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 139 days.

(21) Appl. No.: 10/758,541

(22) Filed: Jan. 16, 2004

(65) Prior Publication Data
US 2004/0146782 A1    Jul. 29, 2004

(30) Foreign Application Priority Data
Jan. 17, 2003   (JP)   ............................. 2003-008976

(51) Int. Cl.
*H01M 4/58* (2006.01)
*H01M 4/52* (2006.01)

(52) U.S. Cl. .................................... 429/218.2; 429/223
(58) Field of Classification Search ...................... None
See application file for complete search history.

(56) References Cited
U.S. PATENT DOCUMENTS
5,840,166 A    11/1998   Kaneko ....................... 204/293

FOREIGN PATENT DOCUMENTS

| JP | 2000-188106 A | | 7/2000 |
|---|---|---|---|
| JP | 2001-316744 | * | 11/2001 |
| JP | 2001-316744 A | | 11/2001 |

* cited by examiner

Primary Examiner—John S. Maples
(74) Attorney, Agent, or Firm—Kubovcik & Kubovcik

(57) ABSTRACT

An alkaline storage battery having a negative electrode made from a hydrogen absorbing alloy represented by the formula $Ln_{1-x}Mg_xNi_{y-a}M_a$ (where Ln is at least one element selected from rare earth elements, M is at least one element selected from the group consisting of Al, V, Nb, Ta, Cr, Mo, Mn, Fe, Co, Ga, Zn, Sn, In, Cu, Si and P, $0.05 \leq x < 0.20$, $2.8 \leq y \leq 3.9$ and $0.10 \leq a \leq 0.50$) and carbon as a conductive agent, a positive electrode of nickel hydroxide as an active material, and an alkaline electrolyte, and the alkaline storage battery contains not greater than 0.01 weight % of hydrogen or not greater than 0.13 weight % of water in the hydrogen absorbing alloy when the battery is activated and is discharged to 1.0 V at one hour rate (It).

2 Claims, 1 Drawing Sheet

ALKALINE STORAGE BATTERY

FIELD OF THE INVENTION

The present invention relates to an alkaline storage battery. More particularly, the present invention relates to an improved hydrogen absorbing alloy electrode for improving the cycle life of an alkaline storage battery.

BACKGROUND OF THE INVENTION

A nickel-cadmium storage battery has been commonly used as an alkaline storage battery. However, a nickel-hydrogen storage battery that uses a hydrogen absorbing alloy for a negative electrode has recently received attention because it has a high capacity as compared to a nickel-cadmium storage battery, and it is excellent from the view point of protecting the environment because it does not use cadmium.

Nickel-hydrogen storage batteries have been used for portable equipment. It is required to improve the batteries so that they are highly efficient.

As an alloy to be used for the negative electrode of a nickel-hydrogen storage battery, a rare earth-nickel hydrogen absorbing alloy having a crystal structure of the $CaCu_5$ type as the main phase, a Laves phase hydrogen absorbing alloy containing Ti, Zr, V and Ni, and the like, have commonly been used.

However, such hydrogen absorbing alloys do not have sufficient hydrogen absorbing capacity, and it is difficult to increase the capacity of the nickel-hydrogen storage battery.

A rare earth-nickel hydrogen absorbing alloy containing Mg, such as an alloy represented by $Ln_{1-x}Mg_xNi_2$ or $Mg_2LnNi_9$, or a hydrogen absorbing alloy containing at least one element selected from Li, V, Nb, Ta, Cr, Mo, Mn, Fe, Co, Al, Ga, Zn, Sn, In, Cu, Si, P and B in addition to Mg has recently been proposed (for example, Japanese Patent Laid-open publication No. 2001-316744).

However, the hydrogen absorbing alloy containing Mg has a generally larger hysteresis as compared to the rare earth-nickel hydrogen absorbing alloy having a crystal structure of the $CaCu_5$ type as the main phase, and when hydrogen gas is reacted with the hydrogen absorbing alloy at a variable pressure at a constant temperature to absorb and release hydrogen (vapor-solid cycles), an amount of hydrogen remaining in the hydrogen absorbing alloy gradually increases. If such hydrogen absorbing alloy is used for an electrode of an alkaline storage battery and the battery is repeatedly charged and discharged, the capacity of the battery is gradually reduced and the cycle life of the battery is deteriorated.

The hydrogen absorbing alloy described above is easily oxidized. When the alloy is used for a negative electrode of an alkaline storage battery, the alloy is easily oxidized by an alkaline electrolyte. Such oxidation consumes the alkaline electrolyte causing a shortage of the electrolyte which increases resistance in the battery and causes a reduction of the cycle life of the battery.

OBJECT OF THE INVENTION

An object of the present invention is to solve the above-described problems of an alkaline storage battery including a negative electrode comprising (a) a hydrogen absorbing alloy comprising a rare earth-nickel absorbing alloy containing Mg, and (b) carbon as a conductive agent. That is, an object of the present invention is to make it possible to improve the cycle life of the battery without deteriorating the capacity of the battery by an improvement of the rare earth-nickel hydrogen absorbing alloy.

SUMMARY OF THE INVENTION

To solve the above-described problems, the present invention provides an alkaline storage battery comprising a negative electrode comprising a hydrogen absorbing alloy represented by the formula $Ln_{1-x}Mg_xNi_{y-a}M_a$ (where Ln is at least one element selected from rare earth elements, M is at least one element selected from the group consisting of Al, V, Nb, Ta, Cr, Mo, Mn, Fe, Co, Ga, Zn, Sn, In, Cu, Si and P, $0.05 \leq x < 0.20$, $2.8 \leq y \leq 3.9$ and $0.10 \leq a \leq 0.50$) and carbon as a conductive agent, a positive electrode comprising nickel hydroxide as an active material, and an alkaline electrolyte, wherein the alkaline storage battery contains not greater than 0.01 weight % of hydrogen in the hydrogen absorbing alloy when the battery is activated and is discharged to 1.0 V at one hour rate (It).

To solve the above-described problem, the present invention provides an alkaline storage battery comprising a negative electrode comprising a hydrogen absorbing alloy represented by the formula $Ln_{1-x}Mg_xNi_{y-a}M_a$ (where Ln is at least one element selected from rare earth elements, M is at least one element selected from the group consisting of Al, V, Nb, Ta, Cr, Mo, Mn, Fe, Co, Ga, Zn, Sn, In, Cu, Si and P, $0.05 \leq x < 0.20$, $2.8 \leq y \leq 3.9$ and $0.10 \leq a \leq 0.50$) and carbon as a conductive agent, a positive electrode comprising nickel hydroxide as an active material, and an alkaline electrolyte, wherein the alkaline storage battery contains not greater than 0.13 weight % of water in the hydrogen absorbing alloy when the battery is activated and is discharged to 1.0 V at one hour rate (It).

Figure 1:
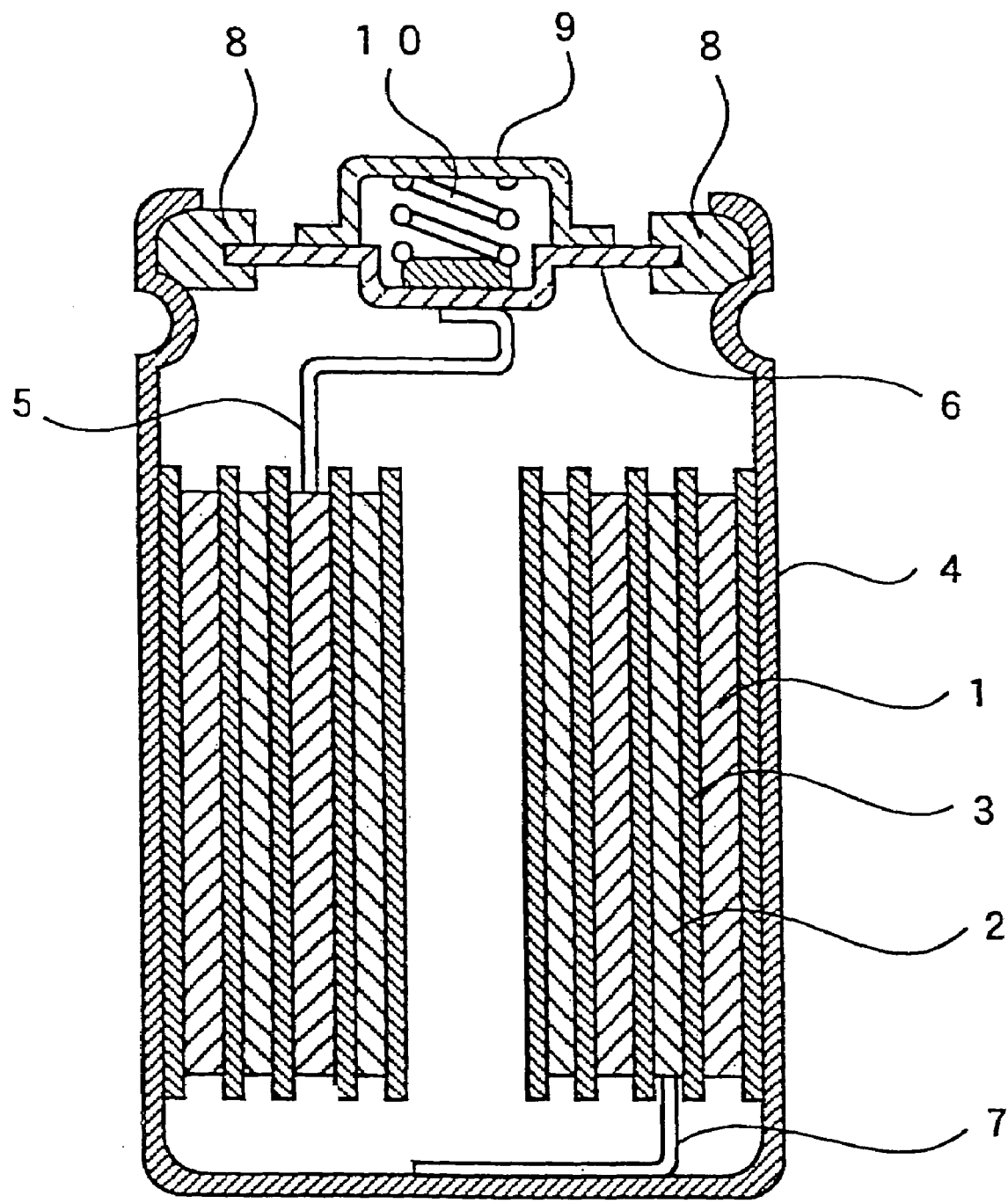
FIG. 1 is a cross section of an alkaline storage battery prepared in the Examples and Comparative Examples.

[Explanation of Elements]
1: positive electrode
2: negative electrode (hydrogen absorbing alloy electrode)
3: separator
4: battery can
5: positive electrode current collector
6: seal plate
7: negative electrode current collector
8: insulation packing
9: positive electrode external terminal
10: coil spring

DETAILED EXPLANATION OF THE INVENTION

If the hydrogen content or water content in the hydrogen absorbing alloy is not greater than 0.01 weight % or not greater than 0.13 weight %, respectively, when the battery is activated and is discharged to 1.0 V at one hour rate (It), an increase in the amount of hydrogen remaining in the hydrogen absorbing alloy is inhibited when the alkaline storage battery is repeatedly charged and discharged. The hydrogen and water content in the hydrogen absorbing alloy are a function primarily of the composition of the alloy and can be adjusted, as required, by controlling the conditions of preparing the alloy, i.e., dissolution, casting and heat treatment.

The hydrogen and water content of the alloy can be measured by a temperature rising desorption analysis (TDS). Carbon contained as the conductive agent in the hydrogen absorbing alloy inhibits oxidation of the alloy with the alkaline electrolyte.

The alkaline storage battery using the hydrogen absorbing alloy described above can inhibit reduction of battery capacity when charging and discharging are repeated, and the cycle life of the battery is improved.

When hydrogen remains in the hydrogen absorbing alloy in an amount of more than 0.01 weight %, hydrogen is not smoothly released when the alkaline storage battery is charged and discharged. If charging and discharging are repeated, an amount of residual hydrogen is gradually increased to deteriorate the hydrogen absorbing alloy and to shorten the cycle life of the battery.

As the carbon contained in the hydrogen absorbing alloy negative electrode, acetylene black and ketjen black are preferable. The carbon can be included on a surface of the hydrogen absorbing alloy negative electrode or in the electrode.

DESCRIPTION OF PREFERRED EMBODIMENTS

EXAMPLES

Examples of a hydrogen absorbing alloy for an alkaline storage battery of the present invention are described below and are compared with those of comparative examples to show that an improved cycle life is obtained in the alkaline storage battery of the present invention. It is of course understood that the present invention is not limited to these examples and can be modified within the spirit and scope of the appended claims.

Example 1

[Preparation of Negative Electrode]

A hydrogen absorbing alloy ingot comprising La, Ce, Pr and Nd as rare earth elements, Mg, Ni and Al in a mol ratio of 0.21:0.05:0.13:0.44:0.17:3.20:0.10 (La:Ce:Pr:Nd:Mg:Ni:Al) was prepared in a fusion furnace. The ingot was treated at 1000° C. for 10 hours under an argon atmosphere to prepare a hydrogen absorbing alloy ingot having the formula $La_{0.21}Ce_{0.05}Pr_{0.13}Nd_{0.44}Mg_{0.17}Ni_{3.20}Al_{0.10}$. The composition of the alloy was confirmed by X-ray fluorescent spectroscopy.

Then the ingot was mechanically ground under an inert gas, and was classified to obtain a hydrogen absorbing alloy powder having an average particle diameter of 65 µm.

100 Parts by weight of the hydrogen absorbing alloy, 0.4 part by weight of sodium polyacrylate, 0.1 part by weight of carboxymethylcellulose, 2.5 parts of a 60 weight % polytetrafluoroethylene dispersion and 5 parts by weight of ketjen black were mixed to prepare a paste. The paste was applied on both sides of an electrically-conductive core material comprising a nickel plated punching metal having a thickness of 60 µm, which was pressed after drying and cut to a desired (predetermined) size to prepare a negative electrode.

[Preparation of Positive Electrode]

A sintered nickel electrode which was prepared by a chemical impregnation method by impregnating a nickel sintered substrate having a porosity of 85% in nickel nitrate into which 3 mol % cobalt nitrate and 3 mol % zinc nitrate were added was used as a positive electrode.

[Separator and Electolyte]

A polypropylene nonwoven fabric was used as a separator. 30% by weight of an alkaline electrolyte containing KOH, NaOH and $LiOH.H_2O$ in a ratio of 8:0.5:1 by weight was used. A cylindrical alkaline storage battery having a designed capacity of 1000 mA as shown in FIG. 1 was assembled.

As shown in FIG. 1, the separator 3 was inserted between the positive electrode 1 and the negative electrode 2 and was spirally rolled, and was placed in a battery can 4. The alkaline electrolyte was poured into the battery can 4 in an amount of 0.31 ml per 1 g of the hydrogen absorbing alloy and the can was sealed after an insulation packing 8 was placed between the battery can 4 and a seal plate 6. The positive electrode 1 was connected to the seal plate 6 through a positive electrode current collector 5, and the negative electrode 2 was connected to the battery can 4 through a negative electrode current collector 7. The battery can 4 and sealing lid 6 were electrically insulated by the insulation packing 8. A coil spring 10 was placed between the seal plate 6 and a positive electrode external terminal 9. The coil spring 10 is compressed and releases gas from inside of the battery to the atmosphere when pressure in the battery unusually increases.

Example 2

A hydrogen absorbing alloy ingot comprising La, Pr and Nd as rare earth elements, Mg, Ni and Al in a mol ratio of 0.17:0.33:0.33:0.17:3.20:0.10 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.10}Al_{0.20}$ and an average particle diameter of 51 µm was obtained in the same manner as in Example 1.

An alkaline storage battery of Example 2 was prepared in the same manner as Example 1 except that the hydrogen absorbing alloy powder prepared above was used.

Example 3

A hydrogen absorbing alloy ingot comprising La, Pr and Nd as rare earth elements, Mg, Ni and Al in a mol ratio of 0.17:0.33:0.33:0.17:3.10:0.20 (La:Pr:Nd:Mg:Ni:Al) was prepared in a fusion furnace. After the ingot was prepared, a hydrogen absorbing alloy powder having the formula $La_{0.17}Pr_{0.33}Nd_{0.33}Mg_{0.17}Ni_{3.10}Al_{0.20}$ and an average particle diameter of 54 µm was obtained in the same manner as in Example 1.

An alkaline storage battery of Example 3 was prepared in the same manner as Example 1 except that the hydrogen absorbing alloy powder prepared above was used.

Comparative Example 1

A hydrogen absorbing alloy ingot comprising La, Pr and Nd as rare earth elements, Mg and Ni in a mol ratio of 0.17:0.33:0.33:0.17:3.30 (La:Pr:Nd:Mg:Ni) was prepared in a fusion furnace. After the ingot was prepared, a hydrogen absorbing alloy powder having the formula $La_{0.17}Pr_{0.33}Nd_{0.33}Mg_{0.17}Ni_{3.30}$ and an average particle diameter of 52 µm was obtained in the same manner as in Example 1.

An alkaline storage battery of Comparative Example 1 was prepared in the same manner as Example 1 except that the hydrogen absorbing alloy powder prepared above was used.

Comparative Example X

A hydrogen absorbing alloy ingot comprising La, Pr and Nd as rare earth elements, Ni, Mn, Co and Al in a mol ratio of 0.2:0.4:0.4:3.78:0.3:0.8:0.3 (La:Pr:Nd:Ni:Mn:Co:Al) was prepared in a fusion furnace. After the ingot was prepared, a hydrogen absorbing alloy powder having the formula $La_{0.2}Pr_{0.4}Nd_{0.4}Ni_{3.78}Mn_{0.3}Co_{0.8}Al_{0.3}$ and an average particle diameter of 55 μm was obtained in the same manner as Example 1. The hydrogen absorbing alloy represented by $La_{0.2}Pr_{0.4}Nd_{0.4}Ni_{3.78}Mn_{0.3}Co_{0.8}Al_{0.3}$ is commonly used in nickel-hydrogen batteries.

An alkaline storage battery of Comparative Example X was prepared in the same manner as Example 1 except that the hydrogen absorbing alloy powder prepared above was used.

The batteries of Examples 1, 2 and 3 and Comparative Examples 1 and X were charged at 100 mA (0.1 It) for sixteen hours and then discharged to a battery voltage of 1.0 V at 1000 mA (one hour rate (It)). The above-described charging and discharging of the batteries were repeated three times.

Each alkaline storage battery was taken apart, washed by water, and dried in a vacuum to obtain the hydrogen absorbing alloy from each battery. An amount of residual hydrogen ($H_2$) and water ($H_2O$) in the hydrogen absorbing alloy was measured by using a rising temperature desorption analysis apparatus (Denshi Kagakusha, MOdel: EMD-WA1000) under vacuum by increasing the temperature at a rate of 1° C./sec to 600° C. to obtain the amount of residual hydrogen ($H_2$) and water ($H_2O$) in the hydrogen absorbing alloy by weight %. The results are shown in Table 1.

Each battery of Examples 1, 2 and 3 and Comparative Examples 1 and X was charged at 100 mA (0.1 It) for sixteen hours and then discharged to a battery voltage of 1.0 V at 1000 mA (one hour rate (It))(this charge and discharge cycle is considered one cycle) to measure an initial discharge capacity. Charge and discharge of the batteries were repeated, and the number of cycles to reach 80% of the discharge capacity of the first cycle was measured. The results of cycle life of each battery are shown in Table 1 as an index when the cycle life of battery X is taken as 100.

cycle life as compared to that of the batteries of Comparative Example 1 which was prepared using a hydrogen absorbing alloy not represented by $Ln_{1-x}Mg_xNi_{y-a}M_a$ and of Comparative Example X which was prepared using a commonly used hydrogen absorbing alloy represented by $La_{0.2}Pr_{0.4}Nd_{0.4}Ni_{3.78}Mn_{0.3}Co_{0.8}Al_{0.3}$.

Although in Examples 1, 2 and 3 and Comparative Examples 1 and X, ketjen black was contained as a conductive agent in the hydrogen absorbing alloy negative electrode, when acetylene black is used instead of ketjen black or the conductive agent is added on a surface of the hydrogen absorbing alloy negative electrode, similar results can be obtained.

ADVANTAGES OF THE INVENTION

The alkaline storage battery of the present invention can inhibit an increase of an amount of residual hydrogen in the hydrogen absorbing alloy when the battery is repeatedly charged and discharged. Carbon added to the negative electrode prevents oxidation of the hydrogen absorbing alloy by the alkaline electrolyte.

As a result, when the hydrogen absorbing alloy is used as the negative electrode of the alkaline storage battery, deterioration of battery capacity can be prevented when the battery is repeatedly charged and discharged and cycle life of the battery is improved.

What is claimed is:

1. An alkaline storage battery comprising a negative electrode, a positive electrode comprising nickel hydroxide as a positive electrode active material, and an alkaline electrolyte, wherein the negative electrode comprises (a) a hydrogen absorbing alloy represented by $Ln_{1-x}Mg_xNi_{y-a}M_a$ (where Ln is at least one element selected from rare earth elements, M is at least one element selected from the group consisting of Al, V, Nb, Ta, Cr, Mo, Mn, Fe, Co, Ga, Zn, Sn, In, Cu, Si and P, $0.05 \leq x < 0.20$, $2.8 \leq y \leq 3.9$ and $0.10 \leq a \leq 0.50$) and (b) carbon as a conductive agent, and hydrogen content in the hydrogen absorbing alloy is not greater than 0.01 weight % when the battery is activated and is discharged to 1.0 V at one hour rate (It).

TABLE 1

| | Composition of Hydrogen Absorbing Alloy | | | | | | | Average Particle Diameter | $H_2$ | $H_2O$ | Cycle |
| --- | --- | --- | --- | --- | --- | --- | --- | --- | --- | --- | --- |
| | La | Ce | Pr | Nd | Mg | Ni | Al | (μm) | (weight %) | (weight %) | Life |
| Example 1 | 0.21 | 0.05 | 0.13 | 0.44 | 0.17 | 3.20 | 0.10 | 65 | 0.001 | 0.007 | 110 |
| Example 2 | 0.17 | — | 0.33 | 0.33 | 0.17 | 3.20 | 0.10 | 51 | 0.007 | 0.150 | 105 |
| Example 3 | 0.17 | — | 0.33 | 0.33 | 0.17 | 3.10 | 0.20 | 54 | 0.010 | 0.118 | 115 |
| Comparative Example 1 | 0.17 | — | 0.33 | 0.33 | 0.17 | 3.30 | — | 52 | 0.014 | 0.199 | 80 |
| Comparative Example X | $La_{0.2}Pr_{0.4}Nd_{0.4}Ni_{3.78}Mn_{0.3}Co_{0.8}Al_{0.3}$ | | | | | | | 55 | 0.002 | 0.045 | 100 |

The alkaline storage batteries of Examples 1, 2 and 3 in which the electrodes were prepared from the hydrogen absorbing alloy represented by $Ln_{1-x}Mg_xNi_{y-a}M_a$ (wherein Ln, M, x, y and a are as defined above) had an improved 2. The alkaline storage battery according to claim 1, wherein the carbon is acetylene black and/or ketjen black.

* * * * *